United States Patent [19]

Stobbe et al.

[11] 4,126,819

[45] Nov. 21, 1978

[54] INTERLOCK CIRCUIT FOR COMPLEMENTARY ELECTRONIC SWITCHES

[75] Inventors: Richard E. Stobbe, Greenfield; Michael R. Cesarz, Mequon, both of Wis.

[73] Assignee: Kearney & Trecker Corporation, West Allis, Wis.

[21] Appl. No.: 812,134

[22] Filed: Jul. 1, 1977

[51] Int. Cl.² .............................................. H02M 3/24
[52] U.S. Cl. ..................................... 318/810; 363/56; 363/132; 318/798
[58] Field of Search .................. 318/227; 363/56, 132, 363/131, 137

[56] References Cited

U.S. PATENT DOCUMENTS 3,559,031  1/1971  La Vigna ................................ 363/56
3,878,445  4/1975  Kirkham et al. ...................... 318/227

*Primary Examiner*—Herman J. Hohauser
*Attorney, Agent, or Firm*—Cyril M. Hajweski; Donald J. Piggott

[57] ABSTRACT

Two transistors each have their emitter-collector circuits coupled in series between one end of a motor field winding and the opposite terminals of a D.C. voltage source to switch current flow in either direction through the winding. Two current sensors are provided, one coupled in series with each emitter-collector circuit. The voltage developed across each current sensor is applied through a driver circuit to the base of the other transistor so as to cut one transistor off when the other is conducting and vice versa, thereby eliminating the possibility of having both transistors conduct simultaneously which would short out the voltage source and burn out one or both transistors.

7 Claims, 3 Drawing Figures

INTERLOCK CIRCUIT FOR COMPLEMENTARY ELECTRONIC SWITCHES

BACKGROUND OF THE INVENTION

This invention relates to complementary switching circuits such as used in electric motor control circuits to switch current flow in either direction through a set of motor field windings. Such complementary switching circuits are commonly used in computerized numerically controlled machine tools for energizing the field windings of A.C. induction motors with D.C. pulses of alternate polarity which, taken together, form an A.C. excitation voltage. In such inverter circuits, electronic switch elements such as transistors are connected in complementary pairs to the ends of the motor field windings, each transistor having its emitter-collector circuit coupled in series with one end of the corresponding field winding and one terminal of the D.C. voltage source while the other transistor of the pair has its emitter-collector circuit coupled in series with the same end of the corresponding field winding and the other terminal of the D.C. voltage source.

Normally, the transistors of each pair are turned on and off in complement, i.e., when one transistor of each pair is turned on the other is turned off, and vice versa. However, it is possible for a pair of transistors to "crossfire," i.e., to conduct simultaneously, due to a circuit malfunction such as: (1) a component failure in the driver circuit causing incorrect biasing of one transistor; (2) transient electrical noise at the logical input of the driver circuit or upstream from it; or (3) component or logical failure upstream from the driver circuit. "Crossfiring" is a serious malfunction since it shorts out the D.C. voltage source through the two crossfired transistors and burns out one or both transistors, thereby disabling the motor.

SUMMARY OF THE INVENTION

In accordance with this invention, the problem of "crossfiring" is eliminated by electrically interlocking each pair of electronic switch elements so that when one switch element conducts it biases the other switch element off and vice versa. This is done by connecting a current sensor in series with each switch element and coupling the output of each current sensor to the control input of the complementary switch element to bias it off when current flows through the current sensor above a predetermied level.

DESCRIPTION OF THE PREFERRED EMBODIMENTS

Figure 1:
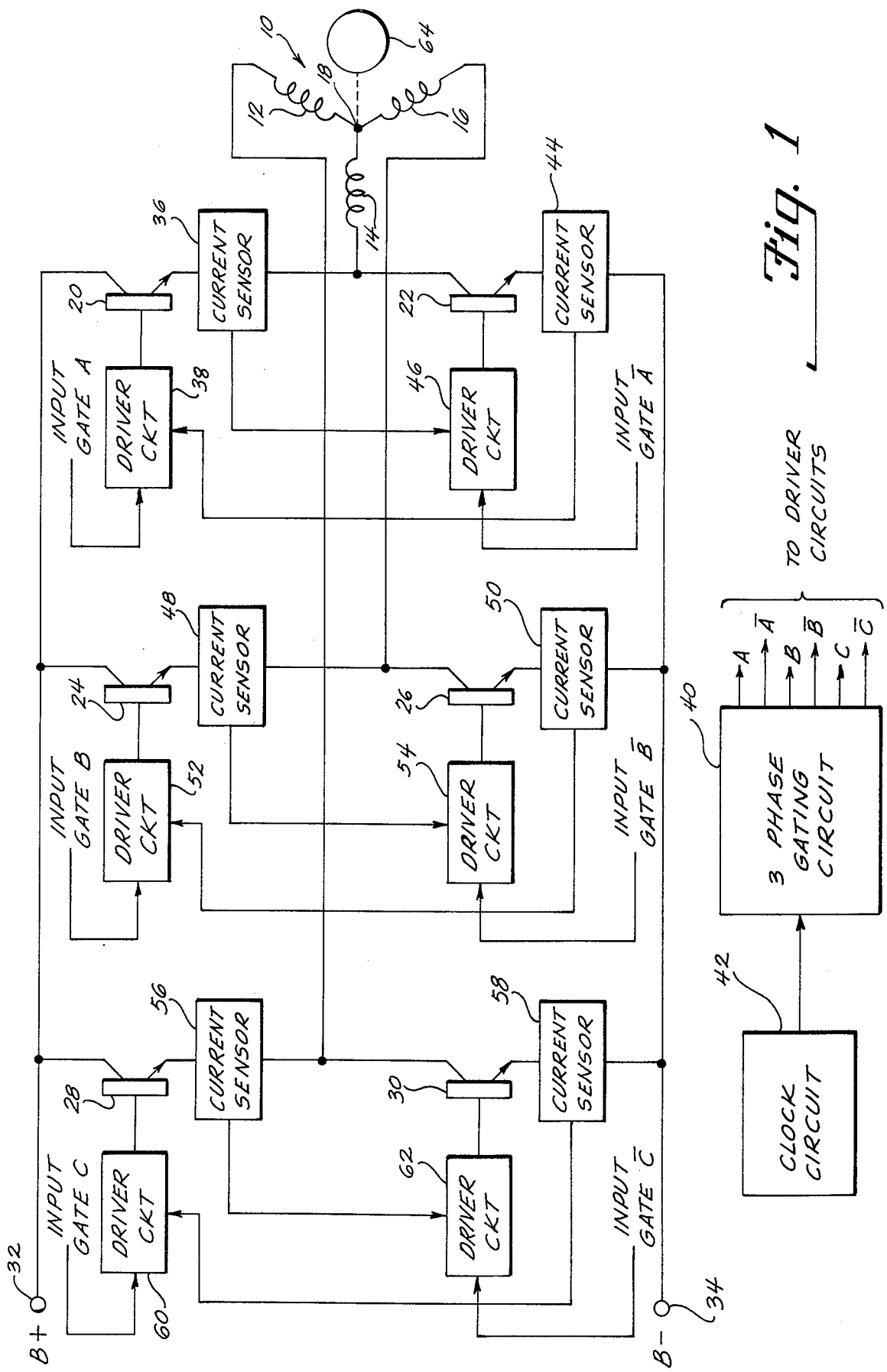
FIG. 1 is a block diagram of a three phase inverter utilizing a preferred embodiment of the invention.
Figure 2:
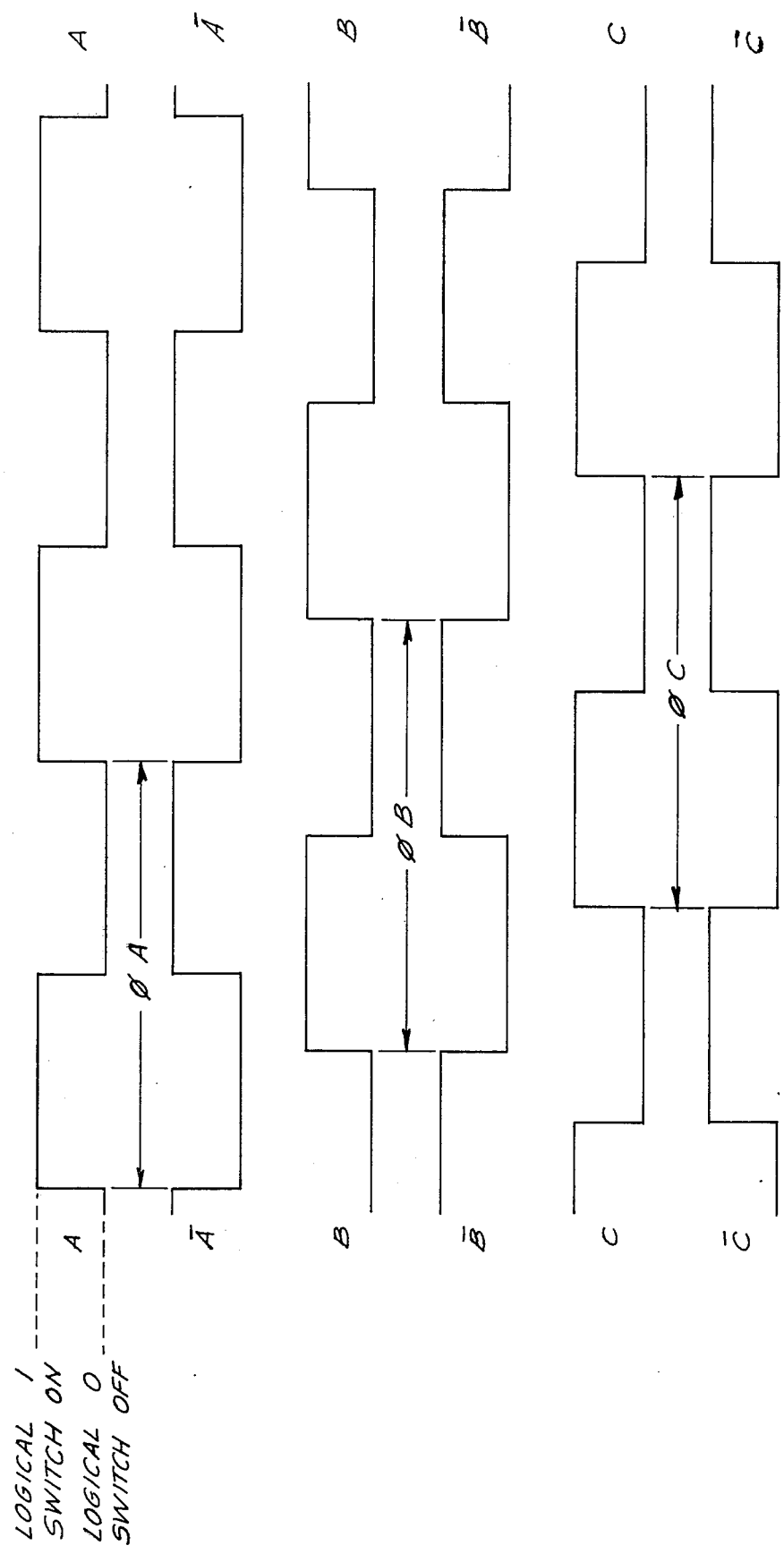
FIG. 2 is a set of waveforms illustrating the operation of the embodiment shown in FIG. 1.

FIG. 1 is a block diagram of a three phase inverter circuit used to energize a three phase induction motor 10 in a machine tool or other application. Motor 10 has three field windings 12, 14, and 16 which are all connected at one end to a common terminal 18 to form a Y connection. The other ends of field windings 12, 14 and 16 are coupled to the emitter-collector circuits of NPN transistors 20, 22, 24, 26, 28 and 30 which are connected to form electronic switches for connecting either the positive terminal 32 or the negative terminal 34 of a D.C. power supply (not shown) to produce current flow in either direction through field windings 12, 14, and 16 to drive motor 10. Transistors 20 through 30 are connected together in complementary pairs which operate to connect either B+ or B− to a corresponding one of the field windings 12, 14 and 16.

Transistors 20 and 22 form the complementary pair of transistor switches for field winding 14. The collector of transistor 20 is coupled to B+ terminal 32 and the emitter is coupled to a current sensor 36 which is coupled to the end of field winding 14. Current sensor 36 produces an output signal in response to current flow therethrough above a predetermined level. When transistor 20 is biased on, it applies B+ voltage to field winding 14. The bias circuit on transistor 20 is controlled by a driver circuit 38 which receives an input from a three phase gating circuit 40. Gating circuit 40 is driven by a clock circuit 42 and produces three phase gating signals for driving transistors 20 through 30 as described in later paragraphs.

The collector of transistor 22 is connected to the end of field winding 14 in parallel with current sensor 36. The emitter of transistor 22 is coupled to a current sensor 44 which is also coupled to B− terminal 34. When transistor 22 is biased on, it applies B− voltage to field winding 14. The bias circuit on transistor 22 is controlled by a driver circuit 46 which receives an input from gating circuit 40 and also from current sensor 36. As described in later paragraphs, the signal from current sensor 36 acts to cut off transistor 22 when transistor 20 is conducting. Current sensor 44 is connected to driver circuit 38 to cut transistor 20 off when transistor 22 is conducting. Thus transistors 20 and 22 are electrically interlocked to prevent crossfiring.

Each of the other two transistor pairs 24–26 and 28–30 are connected in a complementary switching circuit which is the same as described above except that transistor pair 24–26 performs the switching function for field winding 16 while transistor pair 28–30 performs the switching function for field winding 12.

The driver circuits 38, 46, 52, 54 and 60, 62 are all triggered by the three phase output of gating circuit 40 to provide three phase excitation for motor 10. The output of gating circuit 40 causes the outer ends of field windings 12, 14 and 16 to be alternately switched between B+ terminal 32 and B− terminal 34 in such manner as to produce three phase A.C. excitation in field windings 12, 14 and 16 to cause the armature 64 of motor 10 to rotate in the desired direction. Note that the driving waveforms for the complementary transistor pairs are also complementary, i.e. that one waveform of the pair is off when the other is on and vice versa. Waveforms A and $\overline{A}$ form the complementary pair for transistors 20 and 22; waveforms B and $\overline{B}$ form the complementary pair for transistors 24 and 26; and waveforms C and $\overline{C}$ form the complementary pair for transistors 28 and 30. Waveforms A and $\overline{A}$ define phase A ($\phi$A) of the three phase A.C. excitation while waveforms B and $\overline{B}$ define phase B ($\phi$B) and waveforms C and $\overline{C}$ define phase C ($\phi$C). Phases A, B and C are separated from each other by 120° of phase angle and cuase a rotating magnetic field to form within motor 10 in the conventional manner.

Figure 3:
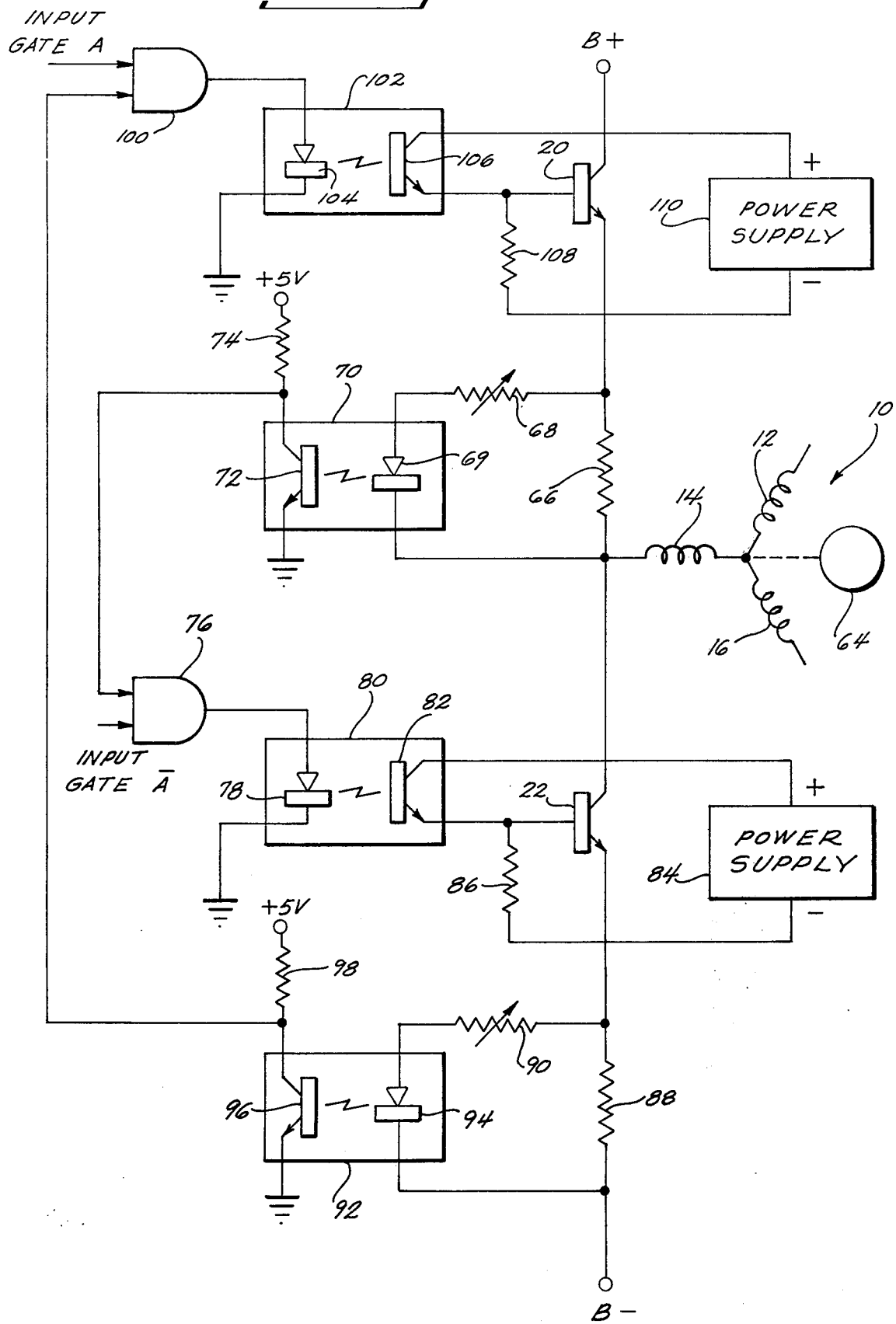
FIG. 3 is a schematic circuit diagram showing one form of current sensor circuit and driver circuit for the embodiment of FIG. 1.

One suitable circuit for current sensors 36 and 44 and driver circuits 38 and 46 is shown in FIG. 3. The emitter of transistor 20 is coupled to field winding 14 via a current sensor resistor 66. The voltage developed across resistor 66 is coupled through variable resistor 68 to the anode of the light-emitting diode 69 of an opto-isolator 70. The cathode of the opto-isolator diode 69 is coupled to the other side of resistor 66. When current flows above a predetermined threshold value through current sensor resistor 66, it causes light to be emitted from diode 69 and the light in turn causes conduction in a photo-transistor 72 in opto-isolator 70. The amount of conduction required to trigger photo-transistor 72 can be adjusted by variable resistor 68. The collector of photo-transistor 72 is coupled to +5VD.C. through a load resistor 74 and the emitter of photo-transistor 72 is coupled to the 5VD.C. ground. Elements 66 through 74 constitute current sensor 36.

The collector of transistor 72 is coupled to one input of an AND gate 76 which also receives input gate $\overline{A}$ from gating circuit 40. The output of AND gate 76 is coupled to the anode of light emitting diode 78 of an opto-isolator 80. The cathode of light emitting diode 78 is coupled to ground. The emitter-collector circuit of photo-transistor 82 is coupled to a power supply 84 therefor in a series circuit which includes a load resistor 86. The emitter of photo-transistor 82 is coupled to the base of transistor 22. Elements 76 through 86 constitute driver circuit 46.

The operation of the above-described circuit is as follows. When transistor 20 is turned on, its emitter current causes light emitting diode 69 to light which turns on photo-transistor 72. When photo-transistor 72 conducts, it places a ground, which is logical O, on one input of AND gate 76 and thus disables AND gate 76. This prevents transistor 22 from being turned on even if it is triggered by a noise pulse on input gate $\overline{A}$, thereby preventing crossfiring. Termination of current flow through transistor 20 turns photo-transistor 72 off and places a +5V D.C. (logical 1) on AND gate 76, thus enabling AND gate 76 and permitting it to trigger transistor 22 through opto-isolator 80 in response to input gate $\overline{A}$.

The current sensor for transistor 22 is similarly interlocked to the driver circuit of transistor 20 to pervent crossfiring when transistor 22 conducts. The current sensor for transistor 22 constitutes resistors 88 and 90, opto-isolator 92, and resistor 98. Its operation is identical to the current sensor described above for transistor 20. The driver circuit for transistor 20 constitutes AND gate 100, opto-isolator 102, resistor 108, and power supply 110. Its operation is identical to the driver circuit described above for transistor 22.

The remaining current sensors 48, 50, 56, 58 and driver circuits 52, 54, 60, 62 are identical to the circuits shown in FIG. 3 and operate in the same manner to cut off one of the corresponding transistor pairs when the other is conducting and vice versa. This interlocking of the transistor pairs prevents "crossfiring" and protects the transistors from being burned out by being shorted across the power source by a transient noise pulse or a component failure.

Although the illustrative embodiments of the invention have been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention now having been fully explained in connection with the foregoing, we hereby claim as our invention:

1. In a complementary switching circuit including a load element, a voltage source having two opposed terminals, a first electronic switch element coupled in series between one terminal of said load element and one terminal of said voltage source, a second electronic switch element coupled in series between said one terminal of said load element and the other terminal of said voltage source, and each electronic switch element having a control input for turning the corresponding switch element off and on, an interlock circuit for preventing both electronic switch elements from being turned on at the same time, comprising:

a first current sensor coupled in series with said first electronic switch element;

means coupling the output of said first current sensor to the control input of said second electronic switch element to switch said second electronic switch element off when said first electronic switch element is conducting current above a predetermined level;

a second current sensor coupled in series with said second electronic switch element; and means coupling the output of said second current sensor to the control input of said first electronic switch element to switch said first electronic switch element off when said second electronic switch element is conducting current above a predetermined level.

2. The switching circuit according to claim 1 wherein each current sensor comprises a current sensor resistor coupled in series with the corresponding electronic switch element and an opto-isolator having an input which is coupled to said current sensor resistor and having an output which is coupled to the control input of the other electronic switch element.

3. The switching circuit according to claim 2 and also comprising a driver circuit for each electronic switch element, each driver circuit comprising:

an AND gate having two inputs and an output, one input of said AND gate being coupled to the current sensor of the other electronic switch element; and a second opto-isolator having an input and an output, the output of said AND gate being coupled to the input of said opto-isolator, and the output of said opto-isolator being coupled to the control input of said electronic switch element.

4. The switching circuit according to claim 3 wherein the output of each current sensor opto-isolator is applied to one input of the AND gate in the opposed driver circuit, and also comprising means for periodically applying signals to the other input of both AND gates to periodically switch said electronic switch elements.

5. The switching circuit according to claim 1 wherein said electronic switch elements are transistors and wherein each current sensor includes a current sensor resistor coupled in series with the emitter-collector circuit of the corresponding transistor.

6. The switching circuit according to claim 1 and also including:

a plurality of load elements;

a pair of electronic switch elements for each load element, each electronic switch element having a control input for turning the corresponding switch element off and on, each electronic switch element of the corresponding pair being coupled between one terminal of the corresponding load element and one terminal of said power supply, a current sensor coupled in series with each electronic switch element, and means coupling the output of each current sensor to the control input of the opposing electronic switch element.

7. The switching circuit according to claim 6 wherein said load elements are motor field windings which are connected in a Y-configuration, wherein said electronic switch elements are transistors, the emitter-collector circuit of each transistor being coupled in series with a corresponding one of said field windings, and wherein each current sensor includes a current sensor resistor coupled in series with the corresponding field winding.

* * * * *